United States Patent
Palansky et al.

(10) Patent No.: US 7,349,754 B1
(45) Date of Patent: Mar. 25, 2008

(54) PROVIDING COMPONENT-SPECIFIC PERFORMANCE CHARACTERIZATION DATA FOR AN ASSEMBLY OR SUBSYSTEM

(75) Inventors: Bruce J. Palansky, Westland, MI (US); Michelle S. Grytzelius, Canton, MI (US); Joe Ulakovich, Windsor (CA); Mahendra Patil, Inkster, MI (US); Kurt H. Nickerson, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/516,322

(22) Filed: Sep. 5, 2006

(51) Int. Cl.
*G06F 19/00* (2006.01)
*G06F 7/00* (2006.01)

(52) U.S. Cl. .................. 700/117; 700/115; 700/224; 700/227; 700/108

(58) Field of Classification Search .............. 700/95, 700/96, 108, 115–117, 215, 221–227; 707/104.1; 701/35

See application file for complete search history.

(56) References Cited

U.S. PATENT DOCUMENTS

| | | | |
|---|---|---|---|
| 5,562,567 A | 10/1996 | Koenig et al. | |
| 5,651,288 A * | 7/1997 | Meeusen | 74/333 |
| 6,244,137 B1 | 6/2001 | Wigness | |
| 6,393,350 B1 | 5/2002 | Light et al. | |
| 6,898,489 B1 * | 5/2005 | Hayes, Sr. | 701/1 |
| 6,912,456 B2 | 6/2005 | Eck et al. | |
| 2004/0148775 A1 * | 8/2004 | Kobayakawa | 29/888.01 |
| 2004/0186637 A1 | 9/2004 | Isogai et al. | |
| 2005/0113949 A1 * | 5/2005 | Honda | 700/95 |
| 2005/0125129 A1 * | 6/2005 | Kim | 701/51 |

* cited by examiner

*Primary Examiner*—Sean Shechtman
(74) *Attorney, Agent, or Firm*—David B. Kelley; MacMillan, Sobanski & Todd, LLC

(57) ABSTRACT

A method for fabricating a motor vehicle including an engine and automatic transmission includes generating first data containing information representing a performance characteristic of a solenoid and a serialized solenoid number, affixing to the solenoid a first barcode matrix containing the first data, installing the solenoid and clutch in the transmission generating second data containing information representing a performance characteristic of clutch, using information from the first and second data to produce third data that includes a serialized transmission number and information from the first data and the second data, affixing to the transmission a third barcode matrix containing the third data, using information from the third barcode matrix to produce fourth data that is tied to a vehicle identification number and information from the first data, the second data and the third data, reading information from the fourth data into an electronic memory of a powertrain control module (PCM), and installing the PCM in the vehicle.

16 Claims, 3 Drawing Sheets

PROVIDING COMPONENT-SPECIFIC PERFORMANCE CHARACTERIZATION DATA FOR AN ASSEMBLY OR SUBSYSTEM

BACKGROUND OF THE INVENTION

The preferred embodiment relates generally to producing components, sub-systems and assemblies thereof that are installed in various products. More particularly, it pertains to associating component-specific performance data with the component and sub-systems to which the data applies throughout the product's assembly and installation process, and during the product's service life.

In an electronically controlled, motor vehicle powertrain system it is conventional to include a transmission control unit (TCU) for controlling an automatic transmission and an engine control module (ECM), for controlling the engine and coordinating operation of the engine and transmission. The TCU typically includes a first microprocessor located near the transmission controls in an oily environment near a hydraulic sump, solenoid-operated hydraulic valves, and a hydraulic pump. The ECM typically includes a second microprocessor located in or near the engine compartment. The microprocessors communicate over a data bus.

A vehicle cost savings could be realized if The TCU were eliminated and the transmission controls, component performance data, control logic, etc. were consolidated in a PCM (Powertrain Control Module). To achieve this result, however, transmission component characterization data for various pressure control solenoids and clutches must be available at a vehicle assembly plant where these data are installed in the PCM of the vehicle with those solenoids instead of into the TCM. There is potentially a need also for a process to trace and transfer transmission component characterization data from the solenoid supplier to the transmission assembly plant, and to associate the data with a particular transmission. At the vehicle assembly plant, the process must flash specific data to the vehicle PCM. The preferably would also support long term vehicle service.

For example, a process for assembling the vehicle would employ electronic tracking and delivery of component-specific solenoid characterization data generated by a solenoid supplier or transmission assembly plant, and clutch data generated at a transmission assembly plant. These data would be transmitted to a vehicle assembly plant for placement in the electronic memory of the PCM.

SUMMARY OF THE INVENTION

A method for fabricating a motor vehicle including an engine and automatic transmission includes generating first data containing information representing a performance characteristic of a solenoid and a serialized solenoid number, affixing to the solenoid a first barcode matrix containing the first data, installing the solenoid and clutch in the transmission, using information from the first data to generate second data containing information representing performance characteristics of the clutches, then to produce third data that includes a serialized transmission number and information from the first data and the second data, affixing to the transmission a second barcode matrix containing the third data, using information from the third barcode matrix to produce fourth data that includes a vehicle identification number and information from the first data, the second data and the third data, reading information from the fourth data into an electronic memory of a powertrain control module (PCM), and installing the PCM in the vehicle.

The two-dimensional barcode matrices and the component and subsystem serial numbers are readily available at steps in the fabrication process to be read electronically. Alternatively, data contained in the barcode matrices can be downloaded from electronic data files that accompany or are available at the plants and plant stations where the components are located.

Implementation of this method produces a reduction in cost of the transmission due to elimination of an electronic transmission control unit (TCU) and incorporation of controls in the PCM. Customer satisfaction with performance of the transmission and vehicle is improved by minimizing shift quality variations for all transmission applications. The component and subsystem can be supplied by multiple suppliers without imposing calibration complexity. Component and subsystem service is improved due to a reduction of complexity and cost of repair due to the process and its substitution for the TCU.

The process can be used to improve performance and reduce cost of any system that uses electronic memory for which part-to-part variation can be quantified including engines, drivelines, electric and electronic supply systems, climate control systems, chassis systems. The method safeguards data accuracy and system reliability, provides a robust process for managing data, identifies failure mode points, and documents failure mode processes. Data produced by the method can be stored for years and recalled for warranty requirements.

According to one embodiment, the process allows the ability to associate component performance data with a newly manufactured component through its use in a final product, a motor vehicle. The component and its data pass through multiple facilities and through many operations. The process involves complete traceability and access to the data by vehicle service providers, such a vehicle dealers at their service garages.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

These and other advantages will become readily apparent to those skilled in the art from the following detailed description of a preferred embodiment when considered in the light of the accompanying drawings in which.

DESCRIPTION OF THE PREFERRED EMBODIMENT

Figure 1:
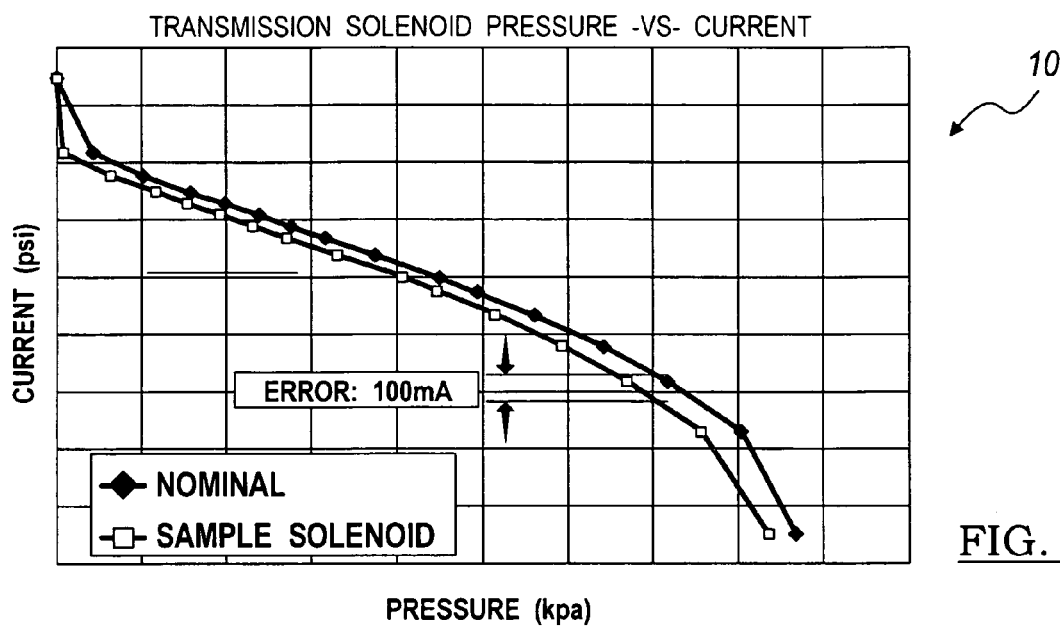
FIG. 1 illustrates a typical graph of solenoid pressure vs. current for a reference solenoid and for a sample solenoid.

An automatic transmission includes solenoids, which operate valves that control various pressures in the hydraulic system of the transmission. The solenoids respond to an electric current signal whose magnitude is intended to produce a desired magnitude of pressure at the respective valve. These solenoids are inaccurate as stand alone components. To avoid inaccuracy in their performance, at step 10, the solenoid manufacturer or transmission assembler trims each solenoid, i.e. determines over a range of applied current the relation between current supplied to the solenoid and the pressure produced in response to the applied current. FIG. 1 illustrates a typical graph of solenoid pressure vs. current for a nominal or reference solenoid and for a sample solenoid, the graph indicating the current error of the sample for a pressure of about 700 kpa. The magnitude of the error varies over the pressure range. The data of FIG. 1 characterize the performance of the sample solenoid, which data will differ from data of each other solenoid and will eventually becomes associated with a particular transmission and vehicle. It is important to preserve, record and associate these solenoid data, which are produced at the supplier's or assembler's plant 12, with the corresponding component, subassembly and product at pertinent steps in subsequent manufacturing, installation and assembly processes that occur at various locations elsewhere.

Figure 2:
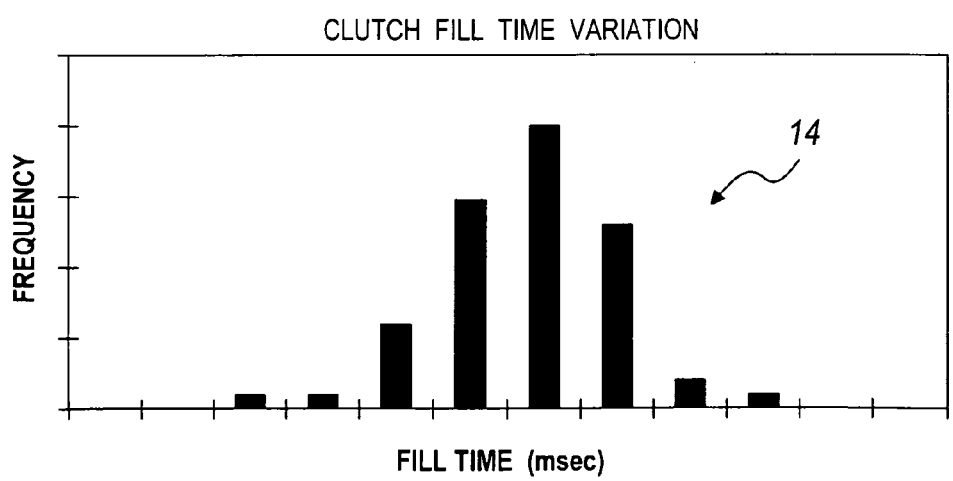
FIG. 2 is a graph showing the number of clutches that are filled in periods of varying length.

The automatic transmission also includes hydraulically actuated clutches, which engage and disengage in response to filling and pressurizing a cylinder containing hydraulic fluid. The period required to stroke the clutch and to fill the volume of each clutch cylinder varies with hydraulic fluid, and that variation affects performance of the transmission and vehicle in which it is installed. To avoid variation in clutch performance, at step 14, the transmission manufacturer determines for each clutch the length of the periods required to stroke and to fill the clutch. FIG. 2 shows an example of the frequency or number of clutches that are filled in periods of varying length. The data of FIG. 2 characterizes the performance of the clutch, which data will differ from data of each other clutch of its type. These data become associated with a particular transmission and eventually a vehicle. It is important to record and associate these clutch data, which are developed at the transmission manufacturer's production plant, with the corresponding component, subassembly and product during manufacturing, installation and assembly processes, which occur at other locations.

Figure 3:
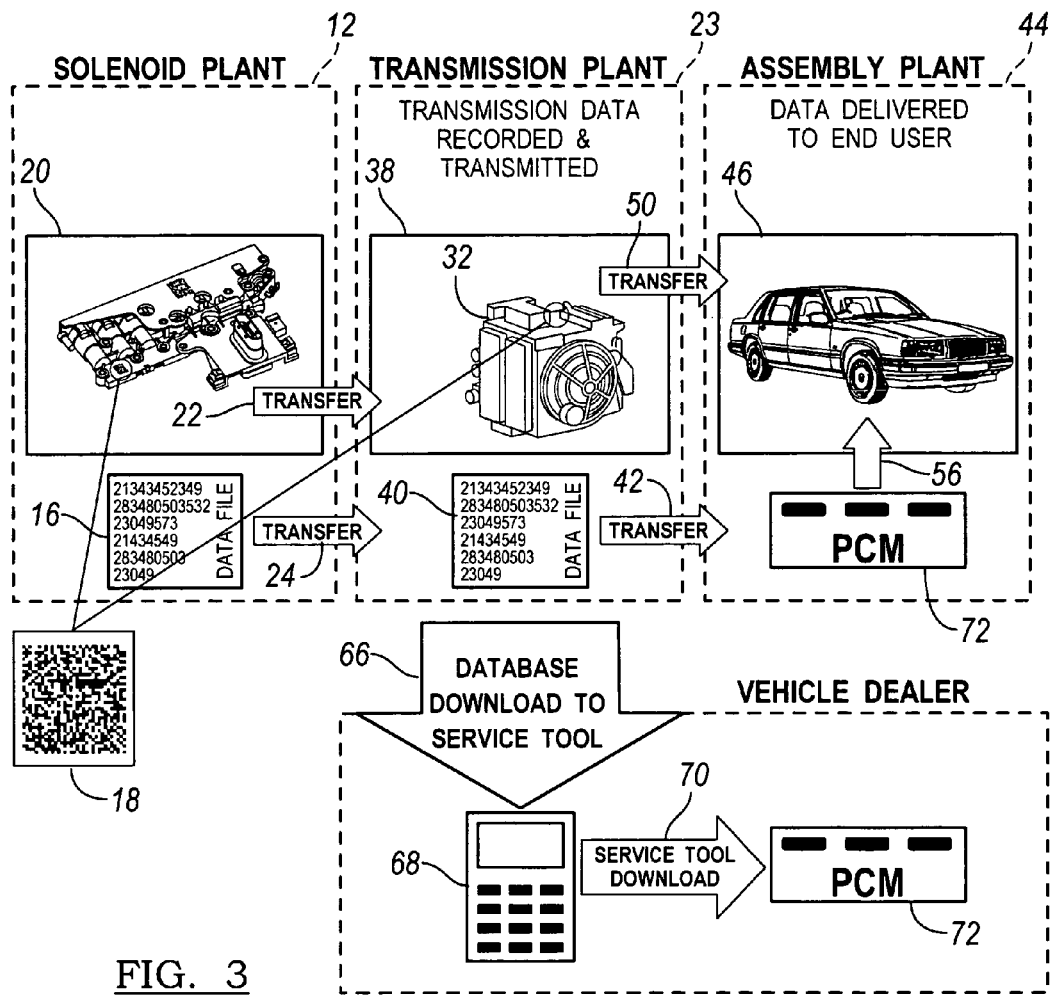
FIG. 3 is a schematic diagram showing steps in the process of installing the solenoid module in a transmission and assembling a vehicle containing the transmission.

Referring now to FIG. 3, the solenoid manufacturer records the performance data of each solenoid into an electronic data file 16, records the performance data of each solenoid in a corresponding solenoid module 20 onto a two-dimensional barcode matrix 18, affixes the barcode matrix to the solenoid module 20, ships 22 the solenoid module to the transmission assembly plant 23, and transmits 24 the electronic data file 16 to the transmission assembly plant.

Figure 4:
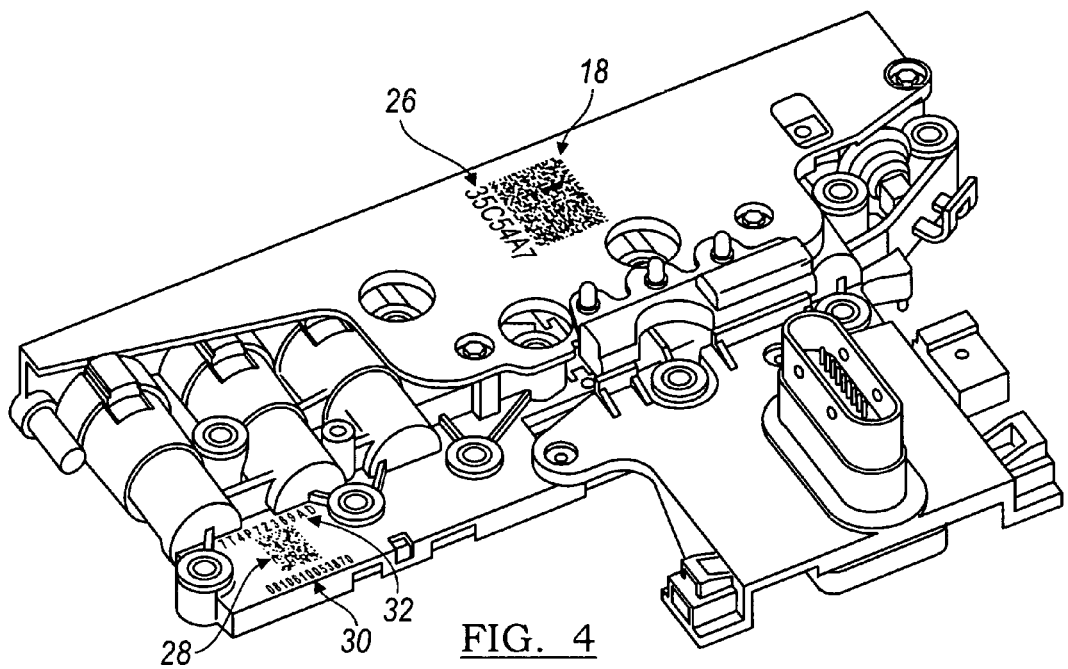
FIG. 4 shows a solenoid module containing solenoids and affixed with data matrices and identifying numbers.
Figure 5:
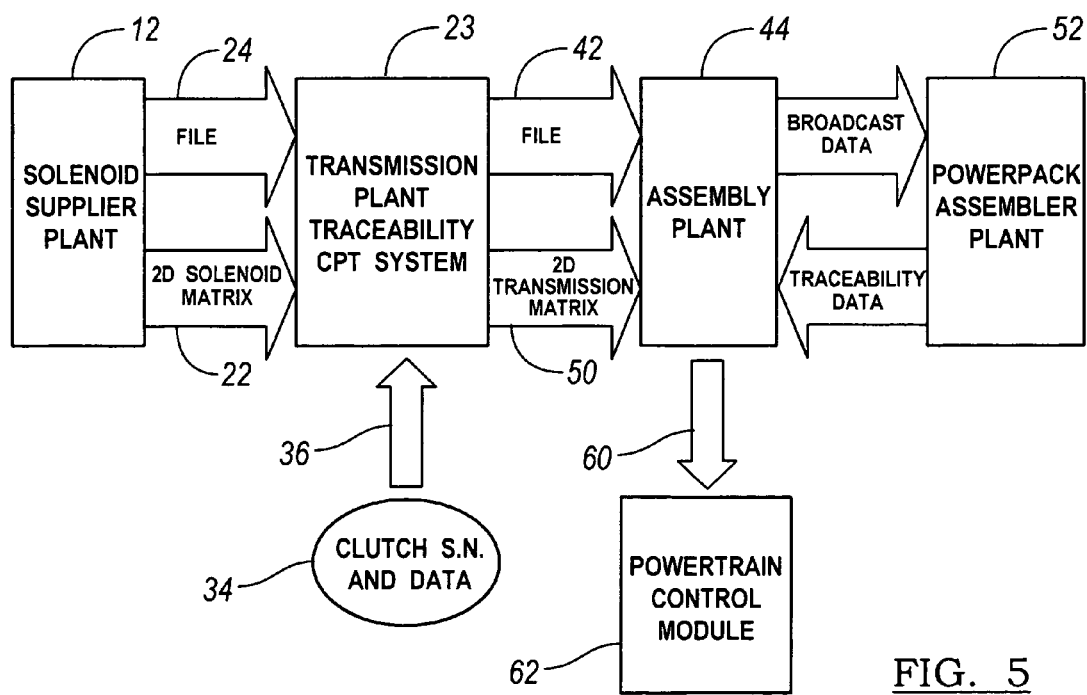
FIG. 5 is a schematic diagram showing steps in the process of installing the solenoid module in a transmission and assembling a vehicle containing the transmission.

FIG. 4 shows the solenoid module 20 affixed with (1) a primary two-dimensional 48×48 barcode matrix 18; (2) a 7-digit human-readable service banding code 26 located adjacent matrix 18; (3) a 31-digit secondary two-dimensional 20×20 barcode matrix 28; and (4) a 13-digit human-readable traceability number 30. The barcode matrix 18, containing the performance data of each solenoid in the respective solenoid module 20, is affixed onto the solenoid module 20 to prevent its being compromised during shipping and handling. The 7-digit human-readable service banding code 26 is generated for each solenoid module. The electronic file 16, which is generated daily, contains the performance data of each solenoid and the serial number of the solenoid module 20, into which the corresponding solenoids are assembled.

The solenoid module 20 and the clutches are installed in a transmission 32 at the transmission manufacturer's plant 23. There, the barcode matrix 18 is scanned, the corresponding solenoid data file 16 is identified, and the solenoid 20 module is installed in the transmission 32. Also at the transmission plant 23, the clutches are installed in transmission 32. The performance data for the installed clutches are taken at transmission final test.

At transmission plant 23, a new two-dimensional barcode matrix 38 containing performance data for the solenoid module 20 installed in transmission 32 is generated, and performance data for the clutches installed in transmission 32 is generated and affixed to transmission 32 with a corresponding transmission serial number. A new data file 40 containing the serial number of transmission 32, performance data for the clutches installed in transmission 32, and performance data for the solenoids in the solenoid module 20 installed in transmission 32 is generated and transmitted 42 to the vehicle assembly plant 44 where transmission 32 will be installed in a vehicle 46.

Transmission 32 is then shipped 50 to vehicle assembly plant 44 or to a powerpack assembler plant 52. A powertrain control module 54, an electronic controller for controlling the vehicle's engine and transmission 32, is also shipped 54 to assembly plant 44.

If transmission 32 is shipped to a powerpack assembler plant 52, the serial number of transmission 32 and the serial number of the engine to be installed in vehicle 46 are associated with the vehicle identification number (VIN) of vehicle 46. A subassembly comprising the engine and transmission 32 are assembled and shipped to a location at the vehicle assembly plant 44 where they are installed in vehicle 46, which is identified by its VIN.

At the end-of-line location, the transmission serial number is used to reference the data file 40 that contains the performance data of the clutches and solenoid module 20 previously installed in transmission 32. The data are transmitted 60 to a powertrain control module (PCU) 62, where they are stored in electronic memory within the PCU at identified memory locations. The data are then used by the PCU to control clutch engagements and disengagements and to control hydraulic pressures in the hydraulic system of transmission 32. The transmission and engine are run at the end-of-line location to test their performance.

The data file 40 may be downloaded 66 to a handheld service tool 68, from which the data can be downloaded 70 to the PCM when required to service the vehicle at a vehicle dealer's service garage 72.

In accordance with the provisions of the patent statutes, the preferred embodiment has been described. However, it should be noted that the alternate embodiments can be practiced otherwise than as specifically illustrated and described.

What is claimed is:

1. A method for fabricating a motor vehicle including an engine and automatic transmission, comprising the steps of:
    (a) generating first data containing information representing a performance characteristic of a solenoid and a serialized solenoid number;
    (b) affixing to the solenoid a first barcode matrix containing the first data;

(c) transporting the solenoid and a clutch to a first location where the transmission is assembled;
(d) installing the solenoid and clutch in the transmission;
(e) generating second data containing information representing a performance characteristic of a clutch and a serialized clutch number;
(g) using information from the first barcode matrix and a second barcode matrix to produce third data that includes a serialized transmission number and information from the first data and the second data;
(h) affixing to the transmission a third barcode matrix containing the third data;
(i) transporting the transmission to a second location where the vehicle is assembled;
(j) using information from the third barcode matrix to produce fourth data that includes a vehicle identification number and information from the first data, the second data and the third data;
(k) reading information from the fourth data into an electronic memory of a powertrain control module; and
(l) installing the powertrain control module in the vehicle.

2. The method of claim 1 further comprising:
producing a first electronic data file containing the first data;
transmitting the first data file to the first location; and
using information from the data file to produce third data that includes the serialized transmission number and information from the first data and the second data.

3. The method of claim 1 further comprising:
producing a first electronic data file containing the first data;
transmitting the first data file to the first location;
producing a second first electronic data file containing the second data;
transmitting the second data file to the first location; and
using information from the first and second data files to produce third data that includes the serialized transmission number and information from the first data and the second data.

4. The method of claim 1 further comprising:
producing a first electronic data file containing the first data;
transmitting the first data file to the first location;
producing a second first electronic data file containing the second data;
transmitting the second data file to the first location;
using information from the first and second data files to produce a third data file containing the first data, the second data and a serialized transmission number;
using information from the third data file to produce fourth data that includes the vehicle identification number and information from the first data, the second data and the third data;
reading information from the fourth data into an electronic memory of the powertrain control module; and
installing the powertrain control module in the vehicle.

5. The method of claim 1 wherein step (a) further comprises:
determining a relation between a magnitude of electric current applied to the solenoid and a magnitude of pressure produced in response to said applied current.

6. The method of claim 1 wherein step (c) further comprises:
determining a length of a period required to fill the clutch with hydraulic fluid.

7. The method of claim 1 wherein step (c) further comprises:
determining an amount of pressure required to stroke the clutch with hydraulic fluid.

8. The method of claim 1 wherein step (i) further comprises:
transporting to a third location an engine, a serialized engine number associated with the engine and the vehicle identification number associated with the engine;
transporting the transmission to the third location;
using the vehicle identification number, the engine serial number, and the transmission serial number to identify the engine and transmission with the vehicle
forming a powertrain subsystem by driveably connecting the engine and the transmission at the third location;
associating the vehicle identification number with the subassembly; and
transporting the subassembly from the third location to a second location.

9. The method of claim 1 further comprising:
downloading information from the fourth data into an electronic memory of a service tool; and
downloading information from the service tool into the electronic memory of the powertrain control module of the vehicle.

10. A method for fabricating a motor vehicle comprising the steps of:
(a) generating first data containing information representing a performance characteristic of a first component and a serialized first component number;
(b) generating second data containing information representing a performance characteristic of a second component and a serialized second component number;
(c) transporting the first component and second component to a first location where a first subsystem containing the first and second components is assembled;
(d) installing the first component and second component in the first subsystem;
(e) using information from the first data and the second data to produce third data that includes a serialized first subsystem number and information from the first data and the second data;
(f) using information from the first data, the second data and the third data to produce fourth data that includes a vehicle identification number and information from the first data, the second data and the third data;
(g) transporting the first subsystem to a second location where it is assembled into a product; associating the vehicle identification number with a second subsystem; transporting a second subsystem, a serialized third component number associated with the second subsystem and the vehicle identification number associated with the second subsystem to a third location; transporting the first subsystem to the third location; using the vehicle identification number, the second subsystem serial number, and the first subsystem serial number to identify the second subsystem and first subsystem with the vehicle; forming a third subsystem by driveably connecting the second subsystem and the first subsystem at the third location, associating the vehicle identification number with the third subsystem; and transporting the third subsystem from the third location to second location;
(h) reading information from the fourth data into an electronic memory; and
(i) installing the electronic memory in the vehicle.

11. The method of claim 10 further comprising:

affixing to the first component a first barcode matrix containing the first data;

affixing to the second component a second barcode matrix containing the second data, and affixing to the first subsystem a third barcode matrix containing the third data.

12. The method of claim 10 further comprising:

producing a first electronic data file containing the first data;

transmitting the first data file to the first location; and using information from the data file to produce third data that includes the serialized first subsystem number and information from the first data and the second data.

13. The method of claim 10 further comprising:

producing a first electronic data file containing the first data;

transmitting the first data file to the first location;

producing a second electronic data file containing the second data;

transmitting the second data file to the first location; and using information from the first and second data files to produce third data that includes the serialized first subsystem number and information from the first data and the second data.

14. The method of claim 10 further comprising:

producing a first electronic data file containing the first data;

transmitting the first data file to the first location;

producing a second first electronic data file containing the second data;

transmitting the second data file to the first location;

using information from the first and second data files to produce a third data file containing the first data, the second data and a serialized first subsystem number;

using information from the third data file to produce fourth data that includes the vehicle identification number and information from the first data, the second data and the third data;

reading information from the fourth data into the electronic memory; and installing the electronic memory in the vehicle.

15. The method of claim 10 wherein step (a) further comprises:

determining a relation between a magnitude of electric current applied to a solenoid and pressure produced in response to the applied current.

16. The method of claim 10 wherein step (c) further comprises:

determining a length of a period required to fill a clutch with hydraulic fluid.

* * * * *